Figure 1:
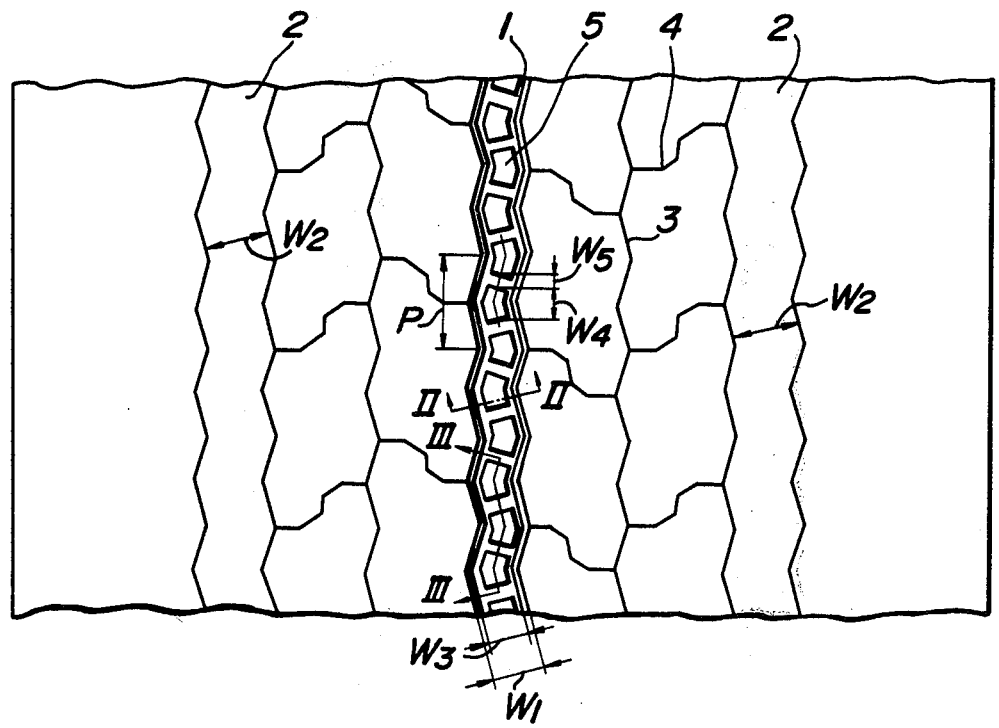

United States Patent [19]

Takigawa et al.

[11] 4,345,632

[45] Aug. 24, 1982

[54] TREAD WITH SPACED PROJECTIONS IN STONE EJECTING GROOVE

[75] Inventors: Hiroyoshi Takigawa, Kodaira; Nobuhiro Miyamura, Higashimurayama, both of Japan

[73] Assignee: Bridgestone Tire Co., Ltd., Tokyo, Japan

[21] Appl. No.: 207,506

[22] Filed: Nov. 17, 1980

[30] Foreign Application Priority Data

Nov. 29, 1979 [JP] Japan .................. 54-153646

[51] Int. Cl.³ ............................ B60C 11/04
[52] U.S. Cl. ............................ 152/209 R
[58] Field of Search ............ 152/209 R, 209 P; D12/140, 141, 136

[56] References Cited

U.S. PATENT DOCUMENTS

| | | | |
|---|---|---|---|
| 2,265,543 | 12/1941 | Overman | 152/209 R |
| 2,779,378 | 1/1957 | Robertson | 152/209 R |
| 2,843,172 | 7/1958 | Berry et al. | 152/209 R |
| 3,682,220 | 8/1972 | Verdier | 152/209 R |
| 3,706,334 | 12/1972 | Hoke | 152/209 R |
| 3,763,911 | 10/1973 | Montagne | 152/209 R |
| 4,230,512 | 10/1980 | Makino et al. | 152/209 R |

*Primary Examiner*—Michael W. Ball
*Attorney, Agent, or Firm*—Sughrue, Mion, Zinn, Macpeak & Seas

[57] ABSTRACT

A heavy duty pneumatic tire having a tread provided on its outer surface with a plurality of circumferential grooves is disclosed. At least one of the circumferential grooves is opened on the tread surface at an open groove width corresponding to 2–8% of tread transverse width, has a groove bottom width substantially equal to the open groove width, and is provided on its groove bottom with plural protrusions separated from the opposed groove walls and at an interval between the adjoining protrusions in the circumferential direction of the groove.

11 Claims, 3 Drawing Figures

TREAD WITH SPACED PROJECTIONS IN STONE EJECTING GROOVE

This invention relates to heavy duty pneumatic tires, and to an improvement of a tread pattern, particularly a tread groove structure in heavy duty pneumatic tires suitable for use in heavy vehicles such as trucks and buses.

In the vehicles of this type, bias tires have been primarily used. Lately, there have been used radial tires each having a rigid reinforcement at its tread portion, particularly a belt reinforcement composed of metal cords such as steel cords or the like.

In general, radial tires are slightly poor in the ride feeling as compared with bias tires, but are considerably advantageous in the wear resistance, puncture resistance and the like. Therefore, they have mainly a tread pattern wherein circumferential ribs are defined by tread grooves extending in the circumferential direction of the tire and having preferably a zigzag form. Also, a so-called rib-type tread pattern has been used but considerations of heat generation, come into question when they are used on improved roads.

However, such a rib-type tread pattern has the following drawbacks when compared with the other tread patterns such as a lug-type pattern and the like.

That is, with a vehicle provided with tires suitable for use on a good road it is unavoidable to run on rough roads in addition to the good road. For instance, a truck may be driven into a construction site. Therefore, there is frequently a chance that obstructions scattered on a road surface such as ground stones and the like are bitten by the circumferential grooves.

In radial tires for heavy vehicles, the movement of the tread portion is suppressed at a ground contact area by the rigid reinforcement for the tread portion as mentioned above, so that stone-biting is apt to occur in the circumferential groove. If so occurred, it is difficult to discharge stones from the groove due to the strong restraining force of the groove. As a result, the stones strike a base rubber between the bottom of the circumferential groove and the reinforcement for the tread portion or the belt for every rotation of the tire to cause the breakage of the base rubber and hence damage the reinforcement inside the base rubber. Particularly, when the belt is composed of metal cords, rust is induced by penetrating water from the damaged portion of the base rubber into the belt and as a result, separation failure of metal cords from rubber is caused. Finally there is the fatal possibility of damaging the durable life of the tire inclusive of the tire recapping.

The harmful influence of stone-biting is similarly caused more or less in bias tires for heavy vehicles having a tread portion of the rib-type pattern.

As the countermeasure against the stone-biting, it has hitherto been attempted to arrange a protruded stripe continuously extending toward the circumferential direction of the tire on the groove bottom of the circumferential groove. In this case, the base rubber on the groove bottom is somewhat protected, but it can not practically and satisfactorily be expected to facilitate the discharge of bitten stones.

It is, therefore, an object of the invention to advantageously solve the problem of stone-biting without raising other serious defects in pneumatic tires for heavy vehicles having a rib-type tread pattern irrespective of the carcass whether bias or radial construction.

As a result of various investigations, the inventors have found that the retention and discharge of stones bitten by the circumferential groove depends considerably upon the groove width of the circumferential groove and stone-biting practically becomes an unavoidable problem when the groove width corresponds to 2–8%, particularly 3–5% of the transverse width of the tread portion (measured along the crown of the tread portion). Furthermore, it has been found that the arrangement of the circumferential groove having the above mentioned groove width in the central part of the tread portion is disadvantageous when compared with the arrangement at both side edges of the tread portion.

In tires for heavy vehicles, it is frequently essential to have the circumferential groove as mentioned above in view of performance required for such tires. Therefore, the invention proposes an improvement of tread groove structure, which is advantageously adaptable for such tires and hardly produces the stone-biting or facilitates the discharge of stones bitten by the groove.

The inventors have made minute investigations with respect to the deformation behavior of the tread portion, particularly circumferential grooves during the rotation of the tire on road surface. As a result, it has been found that in the circumferential groove opening toward the surface of the tread portion at the aforementioned open groove width, the groove bottom width is made substantially equal to the open groove width or the opposed groove walls are inwardly bulged in the depthwise direction of the groove while the groove bottom width is made substantially equal to the open groove width. At the same time plural protrusions are disposed on the groove bottom apart from the opposed groove walls at an interval between the adjoining protrusions in the circumferential direction of the groove, whereby the stone-biting in the circumferential groove is hardly caused and if so caused, the discharge of bitten stones is facilitated.

The countermeasure against the stone-biting according to the invention lies in that it is first designed to prevent the stone-biting and if the stone-biting occurs, it is secondly designed to facilitate the discharge of bitten stones.

The prevention of stone-biting is primarily determined by the groove width as previously mentioned. In the tires having the usual tire size, the stone-biting is conspicuous when the groove width corresponds to 2–8%, particularly 3–5% of the transverse width of the tread portion, so that it is desirable to avoid the groove width of the above defined range as far as possible, but such an avoidance is actually impossible in view of tire performances.

In this connection, a groove having a V-shaped section with a groove angle of more than 16°, which is frequently used in the conventional tread groove, is unsuitable in view of the stone-biting problem. However, a strong lateral force is inversely applied on the groove wall by the wedge action to damage the groove wall. Thus a V-shaped groove is unsuitable.

According to the invention, various investigations have been made with respect to a circumferential groove opening toward the surface of the tread portion (U-shaped groove) and having a groove bottom width substantially equal to the open groove width and as a result, it has been found that such a U-shaped groove hardly produces the wedge action and particularly the contraction of the groove width due to the flattening deformation of the tread portion at the ground contact area of the tire rapidly restores to the original state at the kicking-out side in the rotation of the tire. Hence, stone-biting hardly occurs and this tendency is particularly satisfied by restricting the groove angle to a shallow range of $-5°$ to $+14°$, preferably 4° to 8°.

The term "groove angle" used herein means an acute angle defined between the groove wall and normal line extending from the open edge of the groove and perpendicular to the surface of the tread portion.

The term "groove width" used herein means a distance between the opposed groove walls measured at a section perpendicular to the groove wall.

The so-called U-shaped groove as mentioned above is advantageous in that a strong grasping such as the wedge action does not give rise to ground stones treading by the groove. According to the invention, investigations have further been made with respect to the shape of the groove wall and as a result, it has been confirmed that the opposed groove walls of the U-shaped groove are bulged inwardly such that the groove width is gradually decreased from the open edge to the top of the bulged portion and gradually increased from such a top of the bulged portion to the groove bottom, i.e. the U-shaped groove is deformed into a so-called medium narrowed groove, whereby the invasion of bitten stones into the inside of the groove is advantageously suppressed to develop the positive prevention of the stone-biting.

The ground stones bitten in the medium narrowed portion of the groove are, of course, retained by the opposed groove walls in a time of contacting the groove with ground during the rotation of the tire, but when the kicking-out side of the groove gets out of the ground contact area, the retention of bitten stones is easily released by restoring the groove width to the original state.

In the medium narrowed groove, the narrowed point is located in a position corresponding to 20-50% of the depth of the groove from the tread surface. Also, the minimum groove width of the medium narrowed groove is 50-80% of the open groove width.

In this case, it is desirable that the medium narrowed groove has a sectional contour such that the opposed groove walls are symmetrical to each other with respect to a line passing through the middle narrowed portion or a minimum groove width portion and parallel to the tread surface and further preferably with respect to a center line of the groove width. In this medium narrowed groove, the groove angle of the above defined range of the U-shaped groove may be applied to each part of the groove wall.

The invention not only intends to effectively prevent the stone-biting as mentioned above, but also provides a positive means for eliminating the stone-biting without raising other serious defects as follows.

That is, plural protrusions are disposed on the groove bottom of the aforementioned medium narrowed groove apart from the opposed groove walls and at an interval between the adjoining protrusions in the circumferential direction of the tire.

These protrusions according to the invention, which are discontinuously disposed apart from each other in the circumferential direction of the groove, contributes to effectively eliminate stone-biting as follows.

That is, the protrusions disposed on the groove bottom take a form of a raised bottom with respect to the circumferential groove, so that they assist the function of the groove wall of the medium narrowed groove to prevent the invasion of bitten stones into the inside of the groove. At the same time, these protrusions are compressed at an area contacting with stones in the height direction thereof to store an elastic force at that area independently of the flattening deformation at the ground contact area of the tread portion biting stones in its groove walls, so that when the ground contact area is shifted into the kicking-out area during the rotation of the tire, restoration of groove width to original state is immediately produced and as a result, the aforementioned elastic force brings about the strong discharge of bitten stones in the form of an instantaneous force resulting from the discontinuous arrangement of the protrusions.

Such an instantaneous force occurs by the fact that the difference in the rotating radius of the protrusion between the ground contact area and the kicking-out area is caused by elastically restoring the interval between the adjoining protrusions, which is obliged to be reduced by the flattening deformation at the ground contact area of the tread portion, to the original state at the kicking-out area.

In order to effectively produce such a forced discharge force of bitten stones, it is preferable for each of the protrusions to have a height corresponding to 20-60%, preferably 30-50% of the groove depth measured from the groove bottom. Furthermore, it is preferable that the circumferential interval between the adjoining protrusions is slightly shorter than the circumferential length of each protrusion, and particularly the ratio of the circumferential interval to the circumferential length of 1:0.5~0.8 is more effective.

The reason why the height of the protrusion is limited to the above defined range is based on the fact that the protrusion must not injure the drainage performance of the circumferential groove.

Moreover, it is recommended that the protrusion is made to have a plane substantially parallel to the groove wall of the circumferential groove at a certain distance apart from the groove wall in a sectional projection perpendicular to the groove wall and also a trapezoid in a section along the lengthwise direction of the groove. The circumferential interval between the adjoining protrusions is enlarged outwardly in the radial direction of the tire so as to strongly develop the instantaneous force.

According to the invention, it is practically advantageous to make the circumferential groove into a zigzag form with respect to the circumferential direction of the tire. In this case, it is desirable that the protrusions are disposed that so the circumferential space between the adjoining protrusions is discrepant with the concave or convex point of the zigzag and further that the arrangement of the protrusions corresponds to a half pitch of the zigzag.

Figure 2:
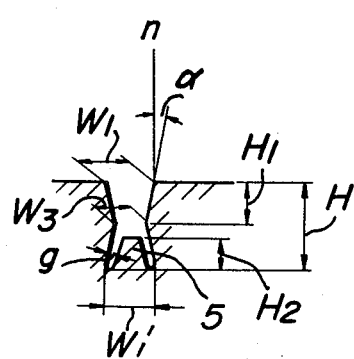
Figure 3:
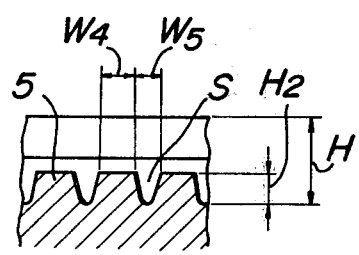

The invention will now be described in detail with reference to the accompanying drawing, wherein:

FIG. 1 is a developed view of an embodiment of the tread portion in the tire according to the invention; and FIGS. 2 and 3 are sectional views taken along the lines II—II and III—III of FIG. 1, under no load respectively.

In FIG. 1 is a developed plan view of the tread portion in the tire having a tire size of 10.00R20 14PR according to the invention and also in FIGS. 2 and 3 are shown sections taken along the lines II—II and III—III of FIG. 1, respectively. In these sections the tire is not under any load.

In the drawing, numerals 1 and 2 represent circumferential grooves each extending toward the circumferential direction of the tire in a zigzag form and dividing the tread portion into four parts. In this embodiment, the transverse width of the tread portion is 200 mm, while the groove 1 disposed on the central part of the tread portion has an open groove width of $W_1 = 8$ mm (corresponding to 4% of the transverse width) and each of grooves 2 disposed on both side parts of the tread portion has an open groove width of $W_2 = 18$ mm (corresponding to 9% of the transverse width).

Moreover, all of these circumferential grooves have a pitch of zigzag of $P = 9.5$ mm. Also, the tread portion is provided with circumferential fine grooves 3 and transverse fine grooves 4, which have an extremely narrow width and divide a rib defined between the circumferential grooves 1 and 2 into testudinate regions.

In the illustrated embodiment, each of the circumferential grooves 2 has a relatively wide groove width not requiring the countermeasure against the stone-biting, while the circumferential groove 1 arranged at the central part of the tread portion requires the countermeasure for preventing the stone-biting as previously mentioned.

As shown in FIG. 2 at a section taken along a line II—II of FIG. 1, the circumferential groove 1 has a medium narrowed shape wherein the opposed groove walls are slightly bulged inward from the open edge of the groove toward the groove bottom at a groove angle of $\alpha = 6°$, which is expressed by an acute inclination with respect to a normal line n of the tread surface stood on the groove edge. The groove walls are then enlarged outward from the top of the bulged portion to the groove bottom to equalize the groove bottom width $W'_1$ to the open groove width $W_1$ at the surface of the tread portion, whereby the circumferential ribs adjacent to the circumferential groove 1 are defined. In this embodiment, the minimum groove width is $W_3 = 6.3$ mm and is located at a distance $H_1$ of 7 mm from the tread surface toward the depthwise direction of the groove, which corresponds to 50% of the groove depth of $H = 14$ mm.

On the groove bottom of the circumferential groove 1 are disposed plural protrusions 5 each having a side wall parallel to the groove wall at a certain gap in the circumferential direction of the groove. In this case, the height $H_2$ of the protrusion 5 from the groove bottom is 5.5 mm and the gap g between the groove wall and the side wall of the protrusions is 1.8 mm.

As shown in FIG. 1, the protrusions 5 extend around the bending points of zigzags in the circumferential groove every a half pitch of the zigzag. In this case, the interval $W_5$ between the adjoining protrusions 5,5 is 3.5 mm corresponding to approximately 0.6 times of the circumferential length $W_4$ of each protrusion of 6.0 mm. As shown in FIG. 3, the space S between the adjoining protrusions extends outwardly in the radial direction of the tire.

The degree of stone-biting was measured under the following test conditions with respect to three tires A, B and C having the same open groove width of the circumferential groove, wherein the tire A is the above illustrated tire, the tire B is a conventional tire having a circumferential groove with a groove angle of 6° at the central part of its tread portion but being not provided with protrusions, and the tire C is a tire having a U-shaped circumferential groove with a groove angle of about 0° and a circumferentially continuous protrusion disposed on the groove bottom thereof. The measured results are shown in the following table.

| Test conditions | |
|---|---|
| Vehicle | flat-bodied truck |
| Rim | 7.50V × 20" |
| Internal pressure | 7.25 kg/cm² |
| Load | JIS 100% load |
| Road course | gravel road in riverbed |
| Travelling distance | 1.6 km |

| Test tire | Degree of stone-biting, index | Evaluation |
|---|---|---|
| A | 100 | good |
| B | 123 | slightly good |
| C | 148 | poor |

In the table, the number of stones bitten in the circumferential groove of each tire is defined by an index on the basis that the tire A is 100. The larger the value, the poorer the prevention of stone-biting.

As stated hereinbefore, the invention effectively and adequately solves the harmful influence of stone-biting at the tread groove in heavy duty pneumatic tires having a so-called rib-type tread pattern, particularly heavy duty pneumatic radial tires wherein the tread portion is considerably reinforced with a rigid belt of steel cords and the like, and is considerably useful for improving the durable life of the tire inclusive of tire recapping.

What is claimed is:

1. In a heavy duty pneumatic tire having a tread provided on its outer surface with a plurality of circumferential grooves, the improvement wherein at least one groove of said circumferential grooves is opened on said tread surface at an open groove width corresponding to 2–8% of a transverse width of said tread, has a groove bottom width substantially equal to said open groove width in such a medium narrowed shape that the groove width is gradually decreased from the edge of said open groove to a certain narrowed point in the depthwise direction of the groove and then gradually increased from said narrowed point to the groove bottom under no load, and is provided on its groove bottom with multiple protrusions separated apart from the opposed groove walls of said groove and at an interval between the adjoining protrusions in the circumferential direction of said groove.

2. A heavy duty pneumatic tire as claimed in claim 1, wherein each of said protrusions has a height corresponding to 20–60%, preferably 30–50% of the depth of said groove as measured from the bottom of the groove.

3. A heavy duty pneumatic tire as claimed in claim 1, wherein said protrusions are disposed on the groove bottom of said groove at a ratio of a circumferential length of said protrusion to an interval between the adjoining protrusion in the circumferential direction of 1:0.5–0.8.

4. A heavy duty pneumatic tire as claimed in claim 1, wherein said circumferential groove extends toward the circumferential direction of the tire in a zigzag form and said protrusions are disposed so that a space between the adjoining protrusions in the circumferential direction of said groove is discrepant with a concave or convex point of the zigzag of said groove.

5. A heavy duty pneumatic tire as claimed in claim 1, wherein said circumferential groove extends toward the circumferential direction of the tire in a zigzag form and an arrangement of said protrusions corresponds to a half pitch of the zigzag of said groove.

6. A heavy duty pneumatic tire as claimed in claim 1, wherein said narrowed point of the medium narrowed shape locates in a position corresponding to 20-50% of the depth of said groove from the tread surface.

7. A heavy duty pneumatic tire as claimed in claim 1, wherein a minimum groove width of said groove with the medium narrowed shape is 50-80% of said open groove width.

8. A heavy duty pneumatic tire as claimed in claim 1, wherein the groove angle of said groove with the medium narrowed shape is no more than 14°.

9. A heavy duty pneumatic tire as claimed in claim 1, wherein said one circumferential groove with the medium narrowed shape is disposed in the central part of said tread.

10. A heavy duty pneumatic tire as claimed in claim 9, further comprising additional circumferential grooves on either side of said one circumferential groove, said additional grooves being devoid of any protrusions therein.

11. A heavy duty pneumatic tire as claimed in claim 10, wherein the open groove width of said additional grooves exceeds 8%.

* * * * *